US012631275B2

(12) United States Patent (10) Patent No.: US 12,631,275 B2
Suzuki (45) Date of Patent: May 19, 2026

(54) CONNECTION ASSEMBLY AND MANIFOLD THEREOF

(71) Applicant: ENTEGRIS, INC., Billerica, MA (US)

(72) Inventor: Yasuji Suzuki, Ota-ku (JP)

(73) Assignee: Entegris, Inc., Billerica, MA (US)

( * ) Notice: Subject to any disclaimer, the term of this patent is extended or adjusted under 35 U.S.C. 154(b) by 386 days.

(21) Appl. No.: 18/384,262

(22) Filed: Oct. 26, 2023

(65) Prior Publication Data

US 2024/0142029 A1 May 2, 2024

Related U.S. Application Data

(60) Provisional application No. 63/419,590, filed on Oct. 26, 2022.

(51) Int. Cl.
 *F16L 35/00* (2006.01)
 *B01D 35/30* (2006.01)
(52) U.S. Cl.
 CPC ............ *F16L 35/00* (2013.01); *B01D 35/306* (2013.01); *B01D 2201/4023* (2013.01)

(58) Field of Classification Search
 CPC   F16L 35/00; F16L 37/56; F16L 25/00; B01D 35/306; B01D 2201/4023; B01D 35/02; B01D 2201/304
 See application file for complete search history.

(56) References Cited

U.S. PATENT DOCUMENTS 11,285,413 B2    3/2022  Sun et al.
11,358,076 B2 *  6/2022  Kashiyama ............ B01D 35/02

FOREIGN PATENT DOCUMENTS

CN        112973262 A    6/2021
EP         3922336 A1   12/2021

* cited by examiner

*Primary Examiner* — Terry K Cecil

(57) ABSTRACT

A connection assembly includes a manifold. The manifold includes a first plate with a first longitudinal slot and a second longitudinal slot, a second plate with sidewalls and flanges that extend from the sidewalls, a lever pivotably coupled to the first plate and the second plate, a first shaft, and a second shaft. The flanges are configured to support a removable cartridge. The lever is configured to move the second plate relative to the first plate between a first position and a second position. The first shaft extends through the first longitudinal slot, the second plate and the lever. The second shaft extends through the second longitudinal slot and the lever.

20 Claims, 12 Drawing Sheets

CONNECTION ASSEMBLY AND MANIFOLD THEREOF

FIELD

This disclosure relates to connection assemblies for removable cartridges. More particularly, this disclosure relates to connection assemblies that include a manifold for attaching a removable cartridge.

BACKGROUND

A connection assembly with a manifold can be used to securely connect a removable cartridge. Removable cartridges can be used for, for example, filtration, tool cleaning, chemical replacement, etc. In some instances, removable cartridges may be configured for treating a fluid. The removable cartridge can be, for example, a filter used to remove contaminants from a fluid. For example, filters can be employed in semiconductor systems to remove contaminants from deionized (DI) water, organic solvents, photoresist chemicals, photochemical solvents, etc.

SUMMARY

In an embodiment, a connection assembly includes a manifold. The manifold includes a first plate with a first longitudinal slot and a second longitudinal slot that extend at or about perpendicular to each other, a second plate, a lever, a first shaft, and a second shaft. The second plate includes sidewalls and flanges extending from the sidewalls. The flanges are configured to support a removable cartridge. The first plate is disposed between the sidewalls of the second plate. The lever pivotably coupled to the first plate and the second plate and is configured to move the second plate relative to the first plate between a first position and a second position. The lever includes side portions. The first shaft extending through the first longitudinal slot in the first plate, one of the sidewalls of the second plate, and one of the side portions of the lever. The second shaft extends through the second longitudinal slot in the first plate and one of the side portions of the lever.

In an embodiment, a connection assembly includes a manifold. The manifold includes a first plate, a second plate, a lever pivotably coupled to the first plate and the second plate, a first shaft and a second shaft. The first plate includes a first longitudinal slot that extends in a first direction and a second longitudinal slot that extends in a second direction that is at or about perpendicular to the first direction. The second longitudinal slot has a first end and a second end that are each offset from the first longitudinal slot in the first direction. The second plate includes sidewalls and flanges extending from the sidewalls. The flanges are configured to support a removable cartridge. The first plate is disposed between the sidewalls of the second plate. The lever is configured to move the second plate relative to the first plate between a first position and a second position. The lever includes side portions. A first shaft extends through the first longitudinal slot in the first plate, one of the sidewalls of the second plate, and one of the side portions of the lever. The second shaft extends through the second longitudinal slot in the first plate and one of the side portions of the lever.

DRAWINGS

FIG. 6 is top view of the connection assembly in FIG. 1A, according to an embodiment.

Like numbers represent like features.

DETAILED DESCRIPTION

Figure 1A:
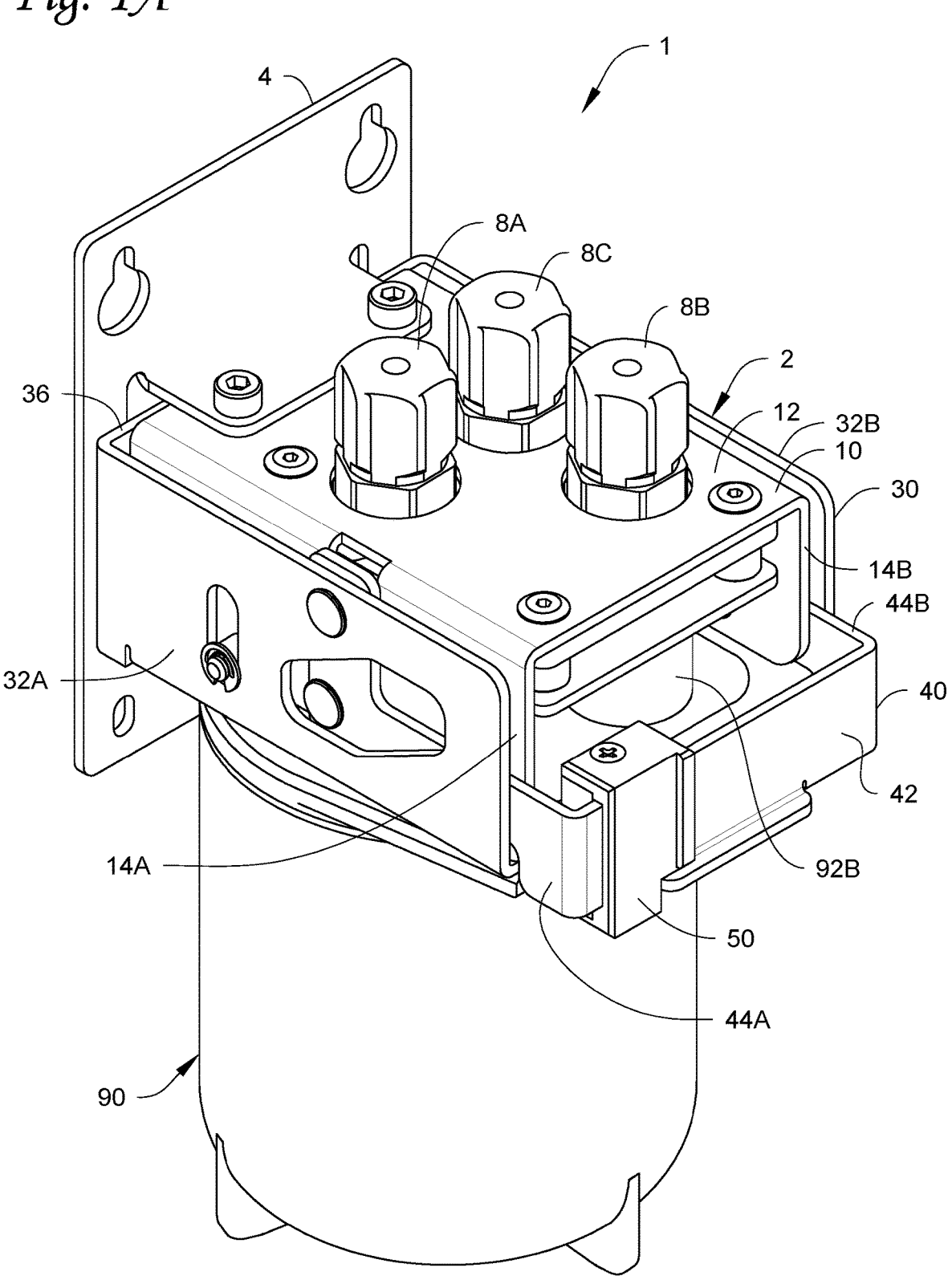
FIG. 1A is a perspective view of an embodiment of a connection assembly with a removable cartridge, in which the connection assembly is in a closed position.
Figure 1B:
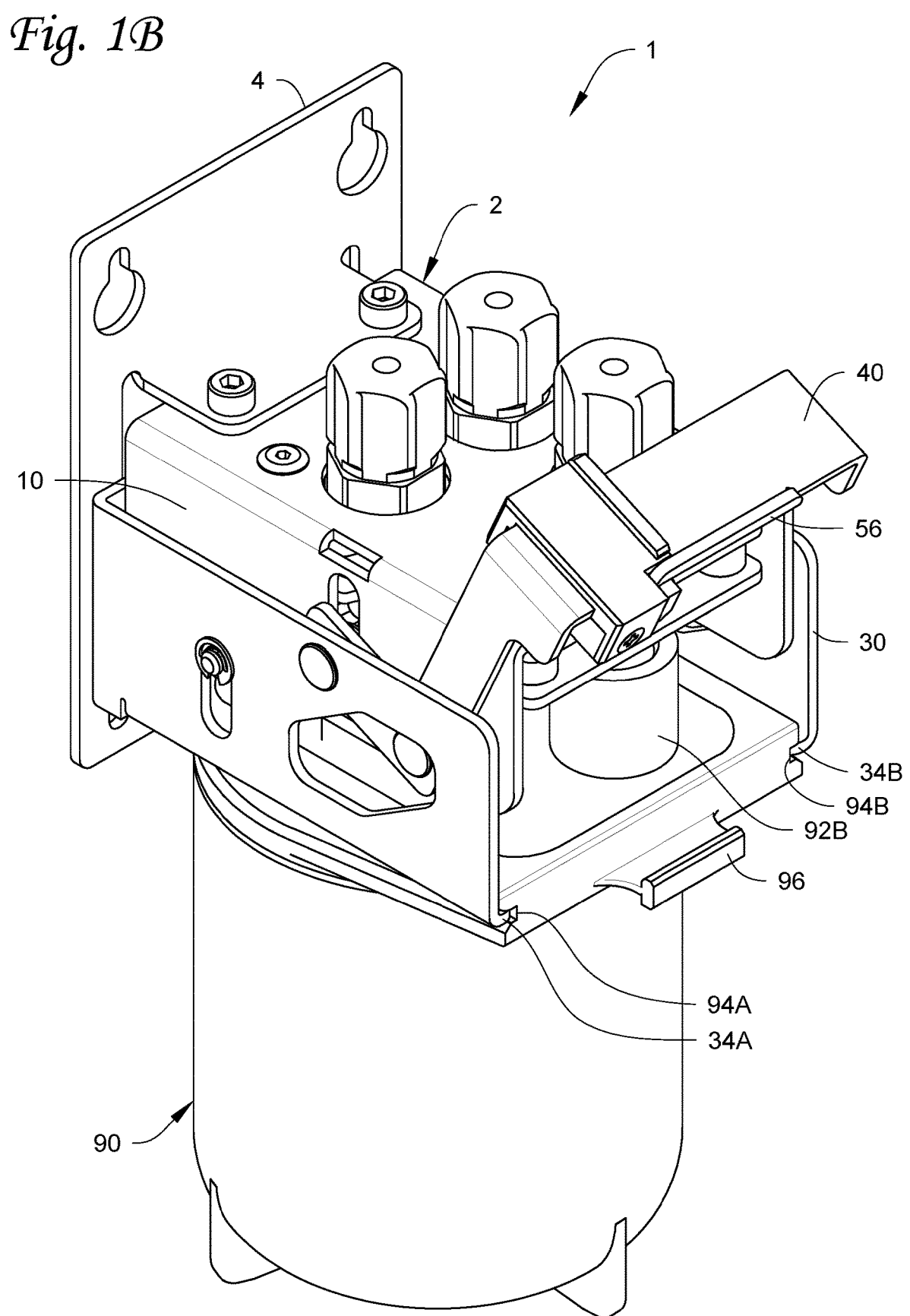
FIG. 1B is a perspective view of the connection assembly with the removable cartridge in FIG. 1, in which the connection assembly is in an open position, according to an embodiment.

FIGS. 1A and 1B each show a perspective view of an embodiment of a connection assembly 1. The connection assembly 1 includes a manifold 2. A removable cartridge 90 is disposed in the manifold 2. The cartridge 90 is a filter cartridge configured to filter contaminants (e.g., solid contaminants, dissolved contaminants, etc.) from a liquid. Liquid is passed through the cartridge 90 and the liquid is filtered as it flows through the cartridge 90. In an embodiment, the cartridge 90 can be filter can be employed in semiconductor manufacturing to remove contaminants. For example, the liquid may be (but is not limited to) deionized (DI) water, organic solvents, photoresist chemicals, photochemical solvents, wet-etching and clean chemicals, etc. For example, the liquid may be an acid or a base used in semiconductor manufacturing.

FIG. 1A shows a perspective view of the connection assembly 1 with the manifold 2 in a closed position, according to an embodiment. FIG. 1B shows a perspective view of the connection assembly 1 with the manifold 2 in an open position. In the closed position, the manifold 2 is configured to prevent the removable cartridge 90 from being removed. The manifold 2 is configured to allow for removal of the removable cartridge 90 from the manifold 2 and the connection assembly 1.

The connection assembly 1 includes a mounting plate 4 and ports 8A, 8B, 8C. The ports 8A, 8B, 8C are configured to each be fluidly connected to the removable cartridge 90, when the manifold 2 is in the closed position. For example, each of the ports 8A, 8B, 8C is fluidly connected to a respective socket 92A, 92B of the removable cartridge 90 in FIG. 1A (the third socket of the cartridge 90 is obscured in FIGS. 1A-2B). Each port 8A, 8B, 8C forms a sealed fluid connection with its respective socket 92A, 92B.

The ports 8A, 8B, 8C include a first port 8A and second port 8B configured to pass liquid through the removable cartridge 90. For example, the first port 8A is configured to supply liquid into the removable cartridge 90 and a second port 8B is configured to receive the liquid discharged from the removable cartridge 90 (i.e., after passing through cartridge 90 and being filtered therein). For example, gas may enter the cartridge 90 along with the liquid. The ports 8A, 8B, 8C can also include a vent 8C for removing gas (e.g., air, gaseous condiments, etc.) from the cartridge 90.

The manifold 2 includes a first plate 10, a second plate 30, and lever 40. The ports 8A, 8B, 8C are fixedly connected to the first plate 10. For example, the manifold 2 can include one or more port support plates 80 that are used to fixedly couple the ports 8A, 8B, 8C to the first plate 10. In the illustrated embodiment, the ports 8A, 8B, 8C each extend through the first plate 10. For example, the ports 8A, 8B, 8C extend through a top wall 12 of the first plate 10.

The cartridge 90 is disposed in the manifold 2 by being supported by the second plate 30. The second plate 30 is configured to support the cartridge 90. As shown in FIG. 2B, the second plate 30 includes flanges 34A, 34B configured to support the cartridge 90. For example, each flange 34A, 34B is disposed in a respective channel 94A, 94B in the cartridge 90. In the illustrated embodiment, manifold 2 is configured to have the cartridge 90 hang from the flanges 34A, 34B of the second plate 30.

As shown in FIG. 1A, the first plate 10 includes a pair of sidewalls 14A, 14B and a top wall 12. The top wall 12 is disposed between the sidewalls 14A, 14B, and connects the sidewalls 14A, 14B to each other. The sidewalls 14A, 14B extend downward from opposite ends of the top wall 12. As shown in FIG. 1A, the sidewalls 14A, 14B and the top wall 12 can form a U shape (e.g., the first plate 10 having a U shape). In the illustrated embodiment, each of the sidewalls 14A, 14B includes a first longitudinal slot 20A, 20B and a second longitudinal slot 24A, 24B (shown in FIG. 3). The longitudinal slots 20A, 20B, 24A, 24B are discussed in more detail below.

The second plate 30 includes a pair of sidewalls 32A, 32B and an end wall 36. The end wall 36 is disposed between the sidewalls 32A, 32B and connects the sidewalls 32A, 32B to each other. For example, the sidewalls 32A, 32B and the end wall 36 are each disposed on a different side of the first plate 10. The first sidewall 32A of the second plate 30 can extend parallel to the first sidewall 14A of the first plate 10. The second sidewall 32B of the second plate 30 can extend parallel to the second sidewall 14B of the first plate 10. As shown in FIG. 1A, the sidewalls 32A, 32B and the end wall 36 can form a U shape with the first plate 10 disposed within the U shaped second plate 30.

The lever 40 is pivotably coupled to the first plate 10 and the second plate 30. The lever 40 is configured to be moveable relative to each of the first plate 10 and the second plate 30. The lever is configured to be moved to actuate the manifold 2 between closed position (as shown in FIG. 1A) and the open position (as shown in FIG. 1B). In the illustrated embodiment, the lever 40 is configured to be moved/pivoted upwards to actuate the manifold 2 from the closed position to the open position. The lever 40 includes a handle 42 and a pair of side portions 44A, 44B that each extend from the handle 42. For example, the side portions 44A, 44B extend from opposite ends of the handle 42. The first side portion 44A of the lever 40 can extend along the first sidewall 14A of the first plate 10 and the first sidewall 32A of the second plate 30. The second side portion 44B of the lever 40 can extend along the second sidewall 14B of the first plate 10 and the second sidewall 32B of the second plate 30.

Figure 2A:
FIG. 2A is a front view of the connection assembly with the removable cartridge in FIG. 1A, according to an embodiment.
Figure 2B:
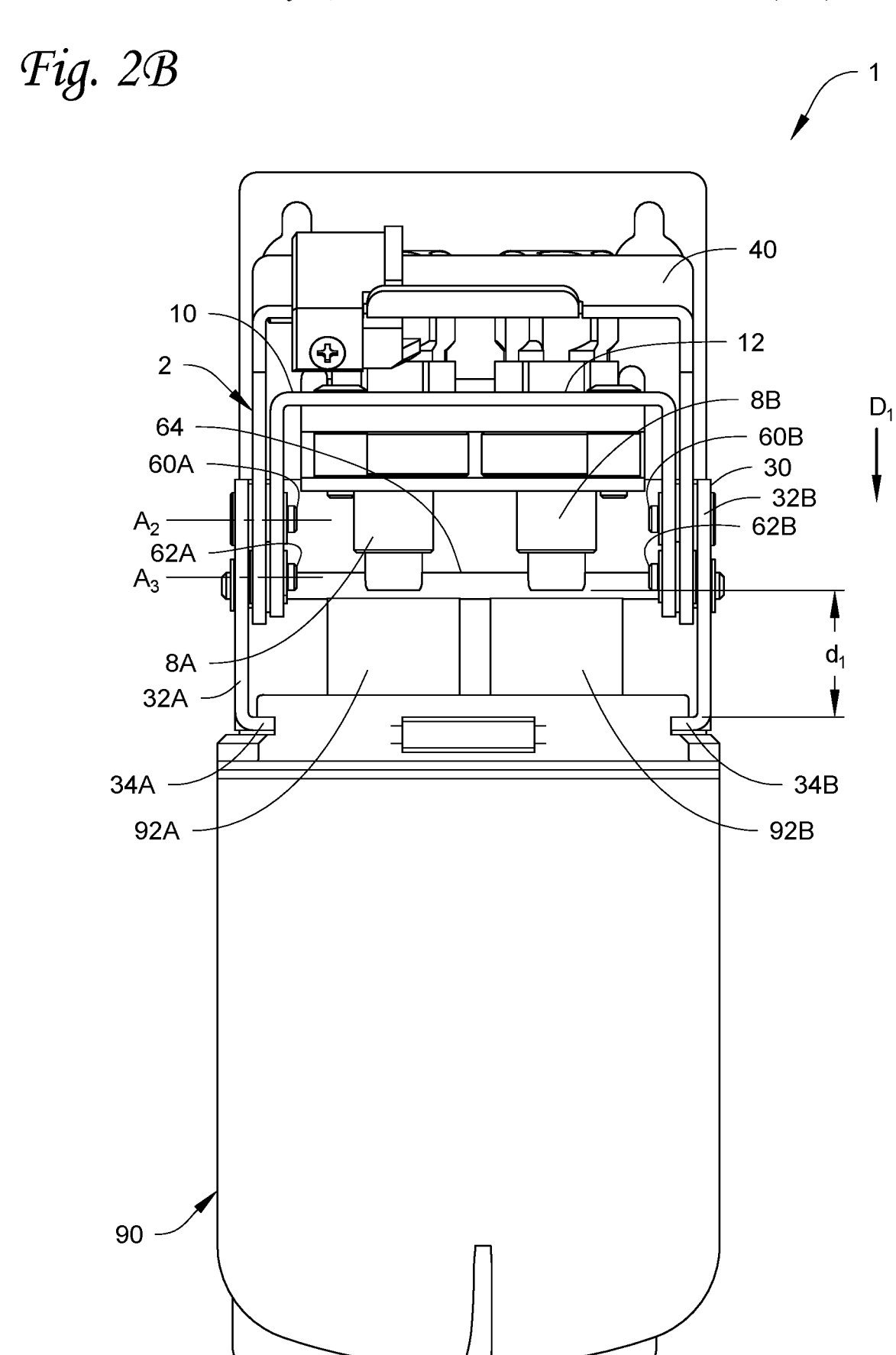
FIG. 2B is a front view of the connection assembly with the removable cartridge in FIG. 1B, according to an embodiment.

As shown in FIG. 2A, the first plate 10 is disposed between the sidewalls 32A, 32B of the second plate 30. Each of the side portions 44A, 44B of the lever 40 is disposed between the first plate 10 and the second plate 30. For example, the first side portion 44A of the lever 40 is disposed between the first sidewall 14A of the first plate 10 and the first sidewall 32A of the second plate 30. For example, the second side portion 44B of the lever 40 is disposed between the second sidewall 14B of the first plate 10 and the second sidewall 32B of the second plate 30. In an embodiment, the one or both of the side portions 44A, 44B of the lever 40 may be disposed to the exterior of second plate 30 (e.g., the first plate 10 and the second plate 30 disposed between the side portions 44A, 44B of the lever 40). For example, in such an embodiment, the first sidewall 32A of the second plate 30 can be disposed between the first sidewall 14A of the first plate 10 and the first portion 44A of the lever 40 and/or the second sidewall 32B of the second plate 30 can be disposed between the second sidewall 14B of the first plate 10 and the second portion 44B of the lever 40.

The configuration of the first plate 10, the second plate 30, and the lever 40 can allow for the manifold 2 to have a more compact size relative to conventional configurations/manifolds. For example, for the same size cartridge 90, the configuration of the manifold 2 can allow it to have a smaller width and/or depth than conventional manifolds.

The actuation/movement of the lever 40 moves the second plate 30 between a first position and a second position relative to the first plate 10. In the illustrated embodiment, the mounting plate 4 is affixed to the first plate 10, such that the actuation/movement of the lever 40 moves the second plate 30 relative to the first plate 10 and the mounting plate 4. In another embodiment, the mounting plate 4 may be affixed to the second plate 30. In such an embodiment, that the actuation/movement of the lever 40 moves the first plate 10 relative to the mounting plate 4, which results in the second plate 30 being moved relative to the first plate 10 by said actuation/movement of the lever 40 (i.e., the actuation/movement of the lever 40 moving the second plate 30 relative to the first plate 10 and the first plate 10 being moved relative to the mounting plate 4).

FIGS. 2A and 2B show a front view of the connection assembly 1, according to an embodiment. FIG. 2A shows the manifold 2 of the connection assembly 1 in the closed position. FIG. 2B shows the manifold 2 of the connection assembly 1 in the open position. The manifold 2 is configured to actuate to vertically move the cartridge 90 disposed in the manifold 2 relative to the ports 8A, 8B, 8C. The actuation from the open position (as shown in FIG. 2B) into the closed position (as shown in FIG. 2A) inserts the ports 8A, 8B, 8C into the cartridge 90. For example, in the illustrated embodiment, the actuation of the open manifold 2 (as shown in FIG. 2B) into the closed position (as shown in FIG. 2A) moves the cartridge 90 upward towards the ports 8A, 8B causing each of the ports 8A, 8B to be inserted into the cartridge 90.

The first position of the second plate 30 corresponds to the closed position of the manifold 2 (e.g., as shown in FIG. 2B). The second position of the second plate 30 corresponds to the open position of the manifold 2 (e.g., as shown in FIG. 2B). As shown in FIG. 2B, in the open position, the second plate 30 is in its second position in which the ports 8A, 8B, 8C are spaced apart from the cartridge 90 (e.g., the ports 8A, 8B, 8C are not inserted into and not fluidly connected to the cartridge 90). For example, in the second/open position, the flanges 34A, 34B of the second plate 30 are spaced a first vertical distance $d_1$ from the ports 8A, 8B, 8C. This first vertical distance $d_1$ is configured to be large enough that the ports 8A, 8B, 8C are entirely removed from the cartridge 90 (e.g., not inserted/disposed within the sockets 92A, 92B of the cartridge 90).

As shown in FIG. 2A, in the closed position, the second plate 30 is in its second position in which the ports 8A, 8B, 8C are in contact with the cartridge 90 (e.g., the ports 8A, 8B, 8C are inserted into and fluidly connected to the cartridge 90). For example, in the first/closed position, the flanges 34A, 34B of the second plate 30 are spaced a shorter vertical distance $d_2$ from the ports 8A, 8B, 8C (i.e., shorter than the first vertical distance $d_1$). The flanges 34A, 34B of the second plate 30 in its first position are disposed closer in the vertical direction $D_1$ to the top wall 12 of the first plate 10 than when the second plate 30 is in its second position.

Figure 3:
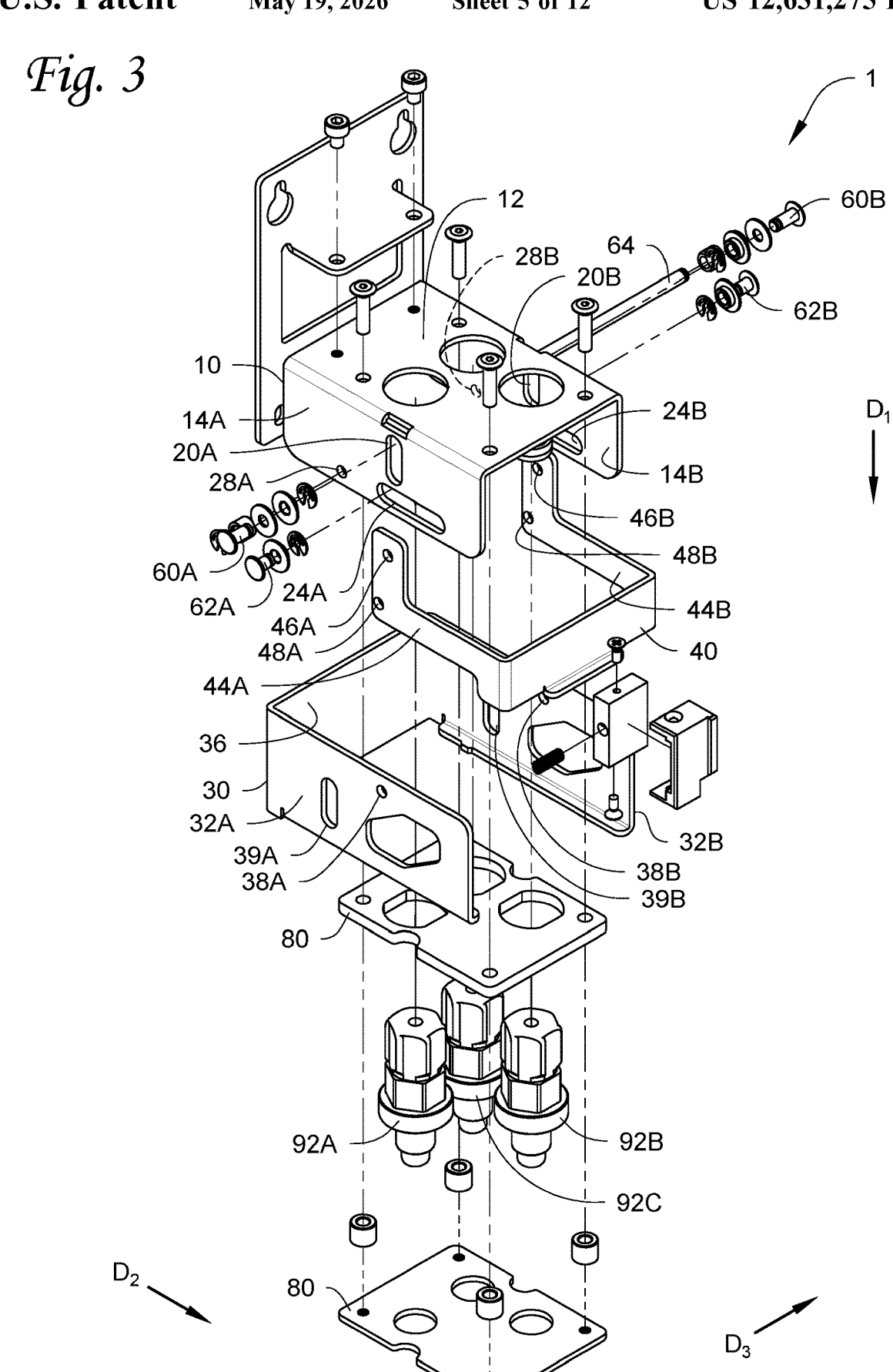
FIG. 3 is an exploded view of the connection assembly in FIG. 1A, according to an embodiment.

FIG. 3 is an exploded view of the connection assembly 1, according to an embodiment. The manifold 2 includes a plurality of shafts that moveably connect the first plate 10, the second plate 30, and the lever 40 to each other. The shafts movably connect the first plate 10, the second plate 30, and the lever 40 such that the actuation of the lever 40 moves the first plate 10 relative to the second plate 30 between a first position and the second position as discussed herein. Each of the shafts extends through two or more of the first plate 10, the second plate 30, and the lever 40. For example, the shafts extend through the sidewalls 14A, 14B of the first plate 10, the sidewalls 32A, 32B of the second plate 30, and the side portions of the 44A, 44B of the lever 40.

The shafts include one or more first shafts 60A, 60B that each extend through the first plate 10, the second plate 30, and the lever 40. The first shaft(s) 60A, 60B each extend at or about parallel to horizontal (e.g., at or about parallel to direction $D_3$). In the illustrated embodiment, the manifold 2 includes first shafts 60A, 60B. For example, one first shaft 60A extends through a first longitudinal slot 20A in the first sidewall 14A of the first plate 10, an aperture 38A in the first sidewall 32A of the second plate 30, and an aperture 46A in the first portion 44A of the lever 40. For example, another first shaft 60B extends through a first longitudinal slot 20B in the second sidewall 14B of the first plate 10, an aperture 38B in the second sidewall 32B of the second plate 30, and an aperture 46B in the second portion 44B of the lever 40.

The shafts include one or more second shafts 62A, 62B that each extend through the first plate 10 and the lever 40. The second shaft(s) 62A, 62B each extend at or about parallel to horizontal (e.g., at or about parallel to direction $D_3$). In the illustrated embodiment, the manifold 2 includes two second shafts 62A, 62B. For example, one second shaft 62A extends through a second longitudinal slot 24A in the first sidewall 14A of the first plate 10 and a second aperture 48A in the first portion 44A of the lever 40. For example, another second shaft 62B extends through a second longitudinal slot 24B in the second sidewall 14B of the first plate 10 and a second aperture 48B in the second portion 44B of the lever 40.

The shafts can also include one or more third shafts 64 that extend through the first plate 10 and the second plate 30. The third shaft(s) 64 each extend at or about parallel to horizontal (e.g., at or about parallel to direction $D_3$). The third shaft(s) 64 do not extend through the lever 40. In the illustrated embodiment, the manifold 2 includes one third shaft 64. For example, the third shaft 64 extends through an aperture 28A in the first sidewall 14A of the first plate 10, a longitudinal slot 39A in the first sidewall 32A of the second plate 30, a longitudinal slot 39A in the second sidewall 32B of the second plate 30, and an aperture 28B in the second sidewall 14B of the first plate 10.

Figure 4:
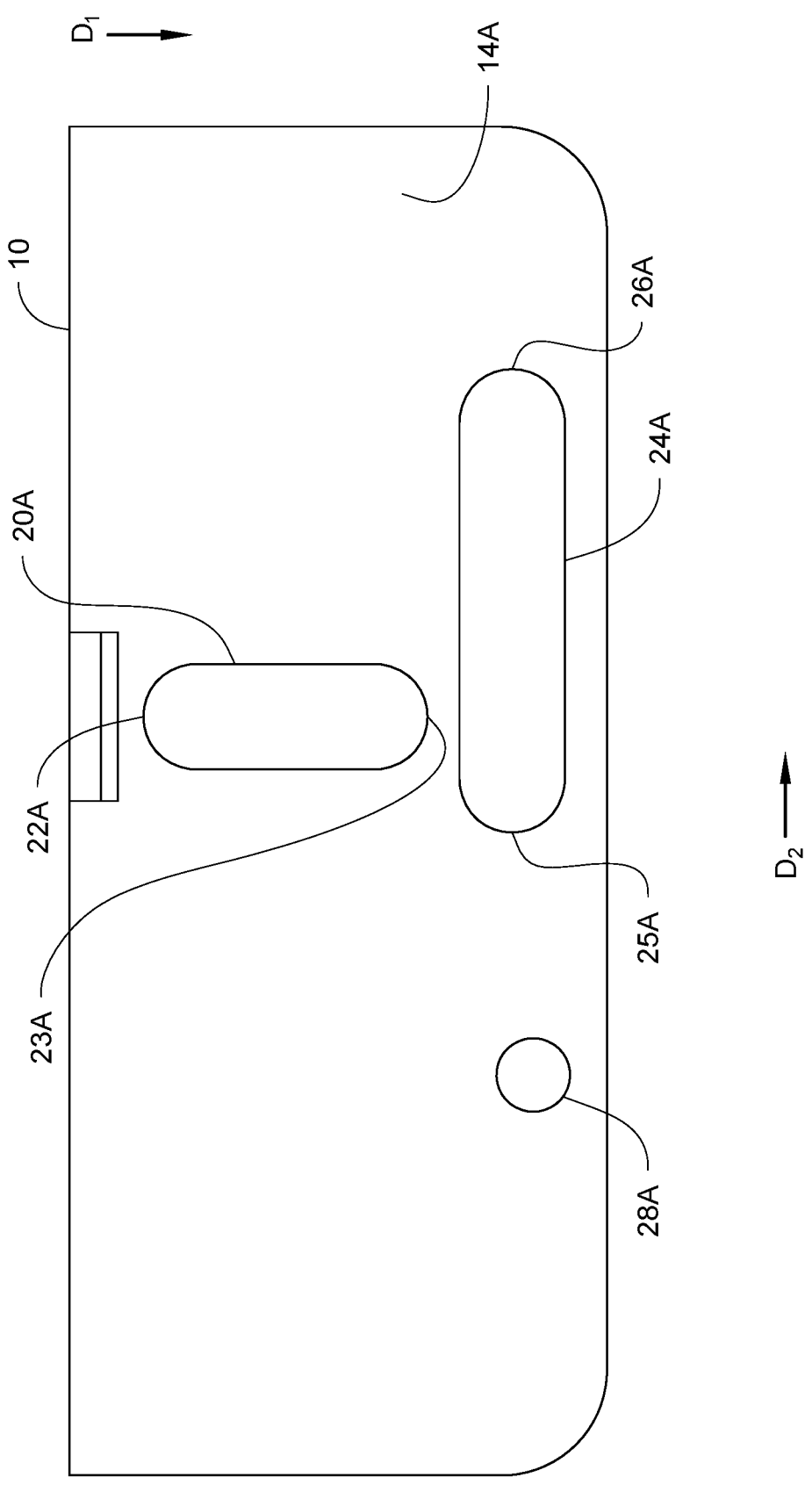
FIG. 4 is a side view of a first plate of the connection assembly in FIG. 1A, according to an embodiment.

FIG. 4 is a side view of the first plate 10 of the manifold 2, accordingly to an embodiment. The first plate 10 includes the (first) sidewall 14A with the first longitudinal slot 20A and the second longitudinal slot 24A. It should be appreciated that the slots 20B, 24B in the second sidewall 14B of the first plate 10 and the movement of shafts 60B, 62B in said slots 20B, 24B may be similar as described for the first sidewall 14A of the first plate 10.

The first longitudinal slot 20A extends in a first direction $D_1$ and the second longitudinal slot 24A extends in a second direction $D_2$. As shown in FIG. 4, the first direction $D_1$ and the second direction $D_2$ extend perpendicular to each other (e.g., extend perpendicular to each other along the same plane). The first direction $D_1$ can be the vertical direction such that the first longitudinal slot 20A is a vertical longitudinal slot in the first plate 10. The second direction $D_2$ can be a horizontal direction such that the second longitudinal slot 24A is a horizontal longitudinal slot in the first plate 10.

The first longitudinal slot 20A has a first end 22A and a second end 23A that are opposite ends of the first longitudinal slot 20A. The second longitudinal slot 24A has a first end 25A and a second end 26B that are opposite ends of the second longitudinal slot 24A. As shown in FIG. 4, the second horizontal slot 24A extends in the second direction $D_2$ across and past the entire width of the first longitudinal slot 20A. Each of the ends 25A, 26A of the second longitudinal slot 24A is offset from the first horizontal slot 24A in the first direction $D_1$. For example, a longitudinal slot has a shape with a major axis and a longitudinal slot extends in a direction along its major axis (e.g., first longitudinal slot 20A extends in the first direction $D_1$ along its axis $A_1$).

Figure 5A:
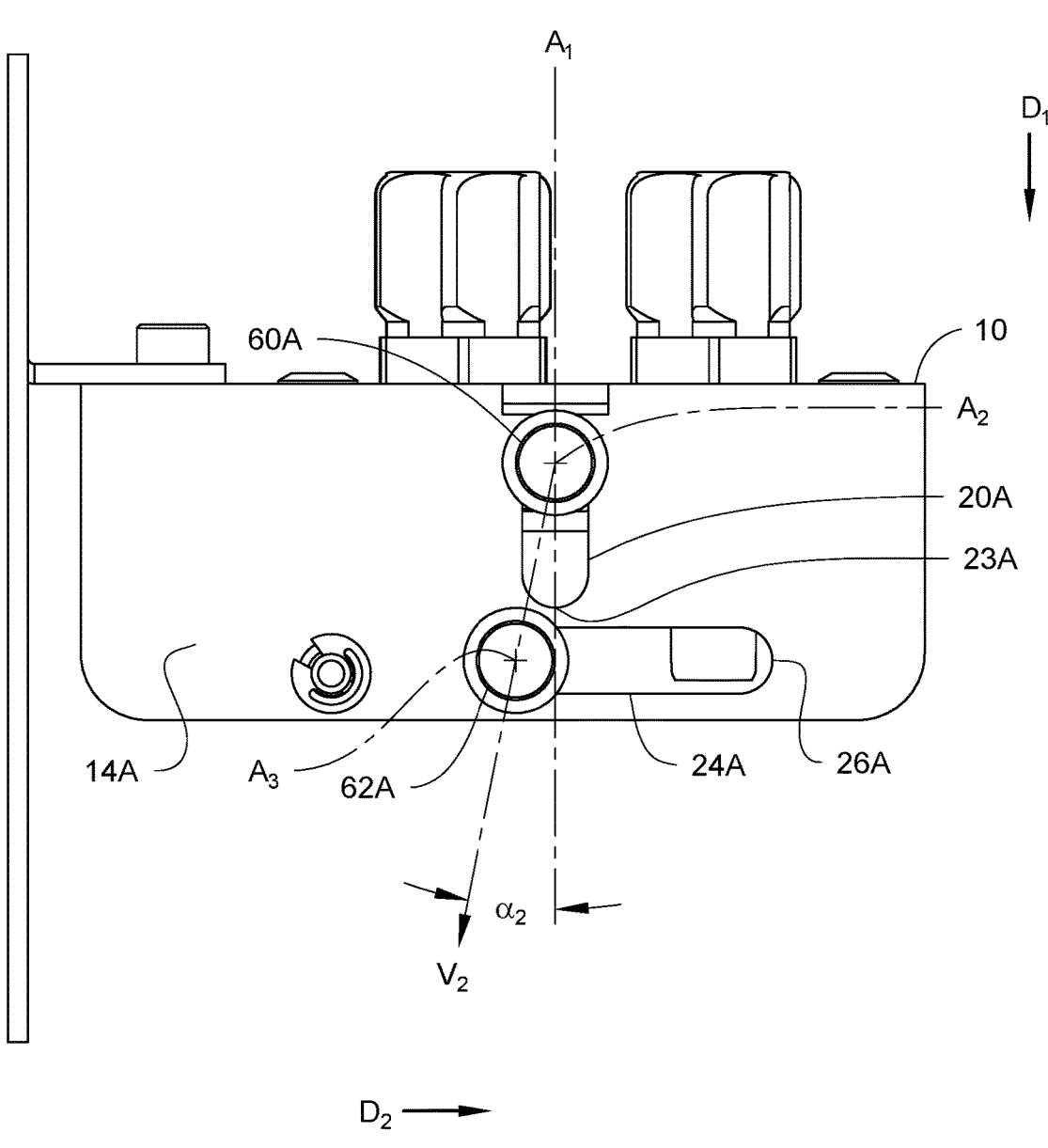
FIG. 5A is a side view of the connection assembly in FIG. 1A, with a lever and a second plate of the connection assembly omitted, according to an embodiment.
Figure 5B:
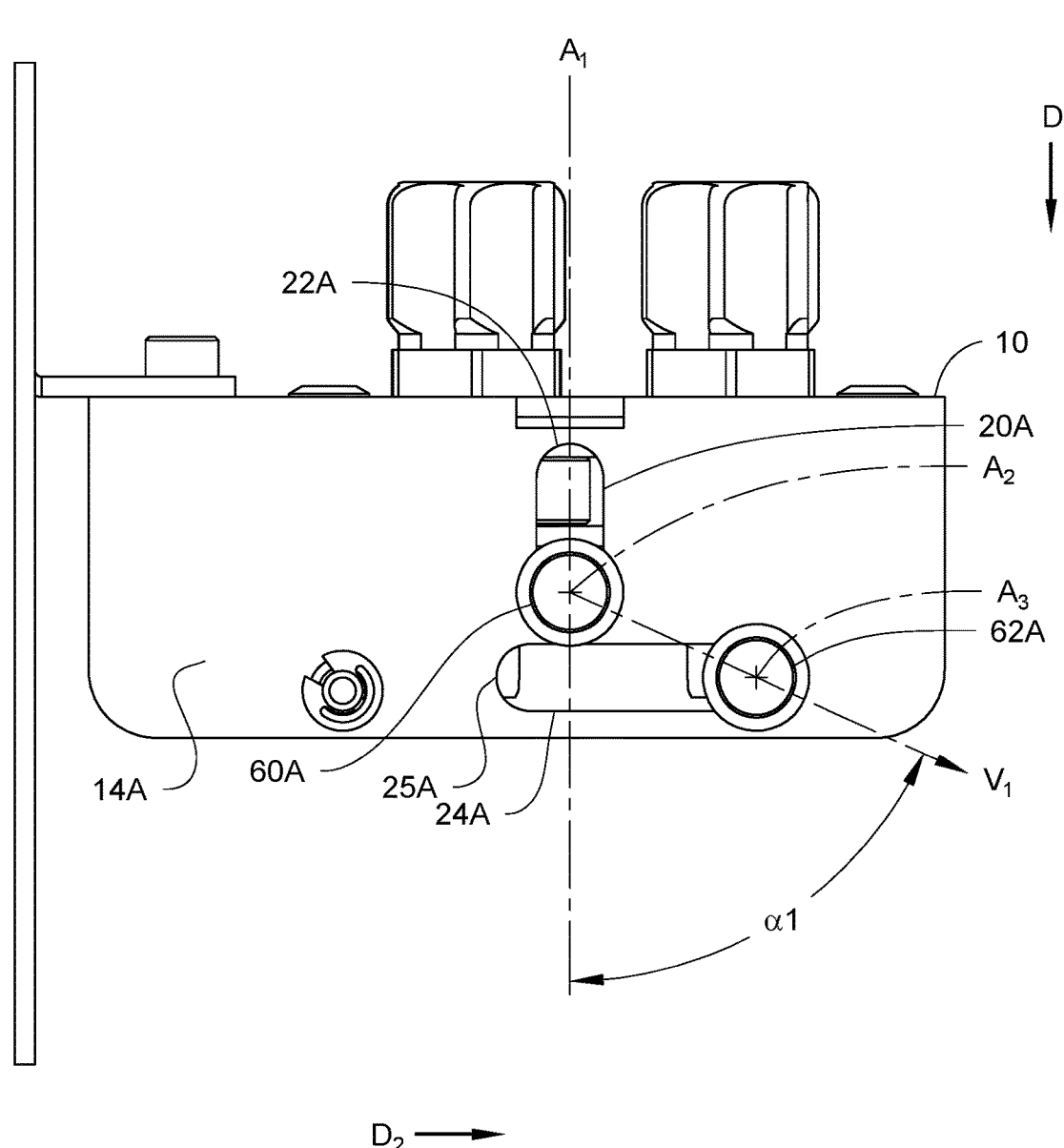
FIG. 5B is a side view of the connection assembly in FIG. 1B, with the lever and the second plate of the connection assembly omitted, according to an embodiment.

FIG. 5A and FIG. 5B are each a side view of the connection assembly 1 with the second plate 30 and the lever 40 omitted, according to an embodiment. For example, the side view in FIGS. 5A and 5B is a view in the horizontal direction $D_3$ as indicated in FIG. 2A. FIG. 5A shows the manifold 2 in the closed position. FIG. 5B shows the manifold 2 in the open position. The first shaft 60A is disposed in the first longitudinal slot 20A of the first plate 10. The second shaft 62A is disposed in the second longitudinal slot 24A of the first plate 10.

The actuation of the lever 40 moves the first shaft 60A along the first direction $D_1$ (e.g., vertically downward, vertically upward) within the first longitudinal slot 20A. The first shaft 60A moves along the axis $A_1$ of the first longitudinal slot 20A. The axis $A_1$ of the longitudinal slot 20A extending in the first direction $D_1$. Said actuation of the lever 40 moves the second shaft 62A in the second direction $D_2$ (e.g., forward, backwards) within the second longitudinal slot 24A. In the closed/first position as shown in FIG. 5A, the first shaft 60A is disposed at the first end 22A of the first longitudinal slot 20A, and the second shaft 60B is disposed at the first end 25A of the second longitudinal slot 24A. In the open/first position as shown in FIG. 5B, the first shaft 60A is disposed at the second end 23A of the first longitudinal slot 20A, and the second shaft 62A is disposed at the second end 26A of the second longitudinal slot 24A.

A vector extends from the axis $A_2$ of the first shaft 60A to the axis $A_3$ of the second shaft 62A. For example, the vector extends parallel to the first sidewall 14A of the first plate 10. The axis $A_2$ of the first shaft 60A and the axis $A_3$ of the second shaft 62A each extending perpendicular to the first and second directions $D_1$, $D_2$ (e.g., into/out of the page in FIGS. 5A and 5B, in the third direction $D_3$ in FIG. 2A).

In the open/second position as shown in FIG. 5B, the angle $\alpha_1$ between the axis $A_1$ of the first longitudinal slot 20A and the vector $V_1$ extending between the axes $A_2$, $A_3$ of the shafts 62A, 62B is greater than 0 degrees. For example, 0 degrees would be vertically downward (e.g., in direction $D_1$, parallel to the axis $A_1$ of the first longitudinal slot 20A). As shown in FIG. 5B, the angle $\alpha_1$ is measured along a plane parallel to the first sidewall 14A of the first plate 10 (e.g., along a plane extending along the vertical direction $D_1$, when viewed in a direction $D_3$ normal to the first sidewall 14A of the first plate 10). In an embodiment, the angle $\alpha_1$ is greater than 20 degrees. In an embodiment, the angle $\alpha_1$ is equal to or greater than 40 degrees. In an embodiment, the angle $\alpha_1$ is equal to or greater than 50 degrees. In an embodiment, the angle $\alpha_1$ is equal to or greater than 60 degrees. In an embodiment, the angle $\alpha_2$ is also less than 70 degrees. For example, the angle $\alpha_1$ in FIG. 5B is about 64 degrees.

In the closed/first position as shown in FIG. 5A, the angle $\alpha_2$ between the axis $A_1$ of the first longitudinal slot 20A and the vector $V_2$ extending between the axes $A_2$, $A_3$ of the shafts 62A, 62B is less than 0 degrees. As shown in FIG. 5A, the angle $\alpha_2$ is measured along a plane parallel to the first sidewall 14A of the first plate 10 (e.g., along a plane extending along the vertical direction $D_1$, when viewed in a direction $D_3$ normal to the first sidewall 14A of the first plate 10). In an embodiment, the angle $\alpha_2$ is equal to or less than negative 5 degrees. In an embodiment, the angle $\alpha_2$ is equal to or less than negative 10 degrees. In an embodiment, the angle $\alpha_2$ is equal to or less than negative 15 degrees. In an embodiment, the angle $\alpha_2$ is equal to or less than negative 20 degrees. In an embodiment, the angle $\alpha_2$ is also greater than negative 90 degrees. For example, the angle $\alpha_2$ in FIG. 5A is about negative 10 degrees.

For example, the configuration of the second longitudinal slot 24A can advantageously cause the ports 8A, 8B, 8C to be fully inserted into their respective socket of the cartridge 90 and then removed slightly from the fully inserted position. For example, a seal (not shown) (e.g., an elastomer seal or the like) is disposed within each socket for ensuring a fluid seal is formed between the ports 8A, 8B, 8C and the cartridge 90. Each port 8A, 8B, 8C compresses its respective seal in the fully inserted position and then is slightly removed such that a fluid seal is formed between each of the ports 8A, 8B, 8C and the cartridge 90. The initial compression of the seal ensures the seal is properly disposed/seated for its respective port 8A, 8B, 8C while the closed position maintains the seal in a desired amount of compression for the seal (e.g., compression that does not damage the seal over time). This configuration can advantageously prevent damaging of the seals while still ensuring a fluid seal is formed between each of the ports 8A, 8B, 8C and the cartridge 90.

Figure 6:
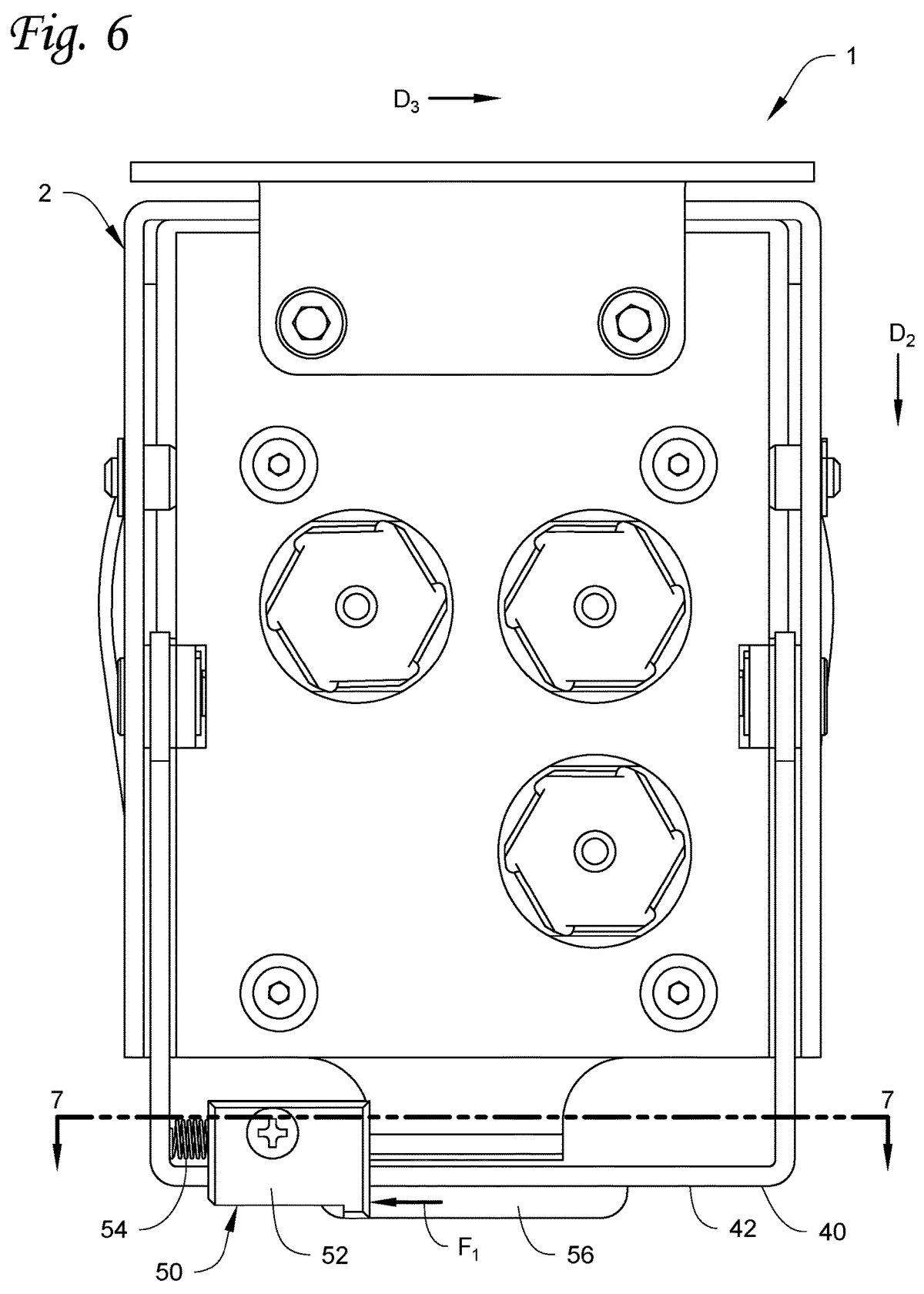

FIG. 6 is a top view of the connection assembly 1 in FIG. 1A. The manifold 2 of the connection assembly 1 is in the first/closed position in FIG. 6. The connection assembly 1 includes a locking tab 52 and a spring 54. The locking tab 52 and the spring 54 form a locking mechanism 50 for the lever 40. The locking tab 52 is moveably coupled to lever 40. For example, the locking tab 52 is configured to be moveably coupled to the handle 42 of the lever 40 such that the locking tab 52 is slidable along the handle 42. For example, the locking tab 52 encircles the handle 42 of the lever 40.

The spring 54 biases the locking tab 52 (e.g., in the direction opposite to the direction $D_3$). The spring 54 pushes the locking tab 52 along the handle 42 in a first direction (e.g., away from the first side portion 44A of the lever, in the direction opposite to the direction $D_3$). For example, a protrusion 56 extends from the handle 42, and the spring 54 is configured to push the locking tab 52 against the protrusion 56 on the handle 42. The locking tab 52 is configured to prevent the lever from moving the manifold 2 from the closed position without application of an external force $F_1$ to the locking tab 52. The spring 54 is configured to prevent the locking tab 52 from moving unless the external force $F_1$ opposite to its biasing direction is applied to the locking tab 52.

Figure 7:
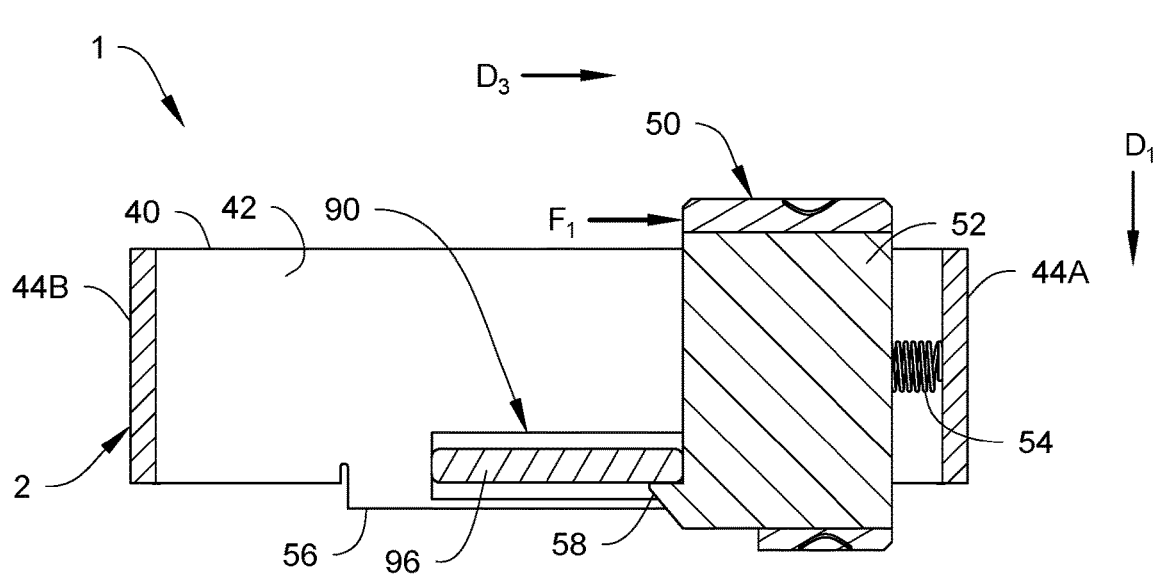
FIG. 7 is a cross-sectional view of the connection assembly as indicated in FIG. 6, according to an embodiment.

FIG. 7 is a vertical cross-sectional view of the connection assembly 1 as indicated in FIG. 6, according to an embodiment. As previously discussed, the cartridge 90 includes an outward protruding lip 96. As shown in FIG. 1B, the lip 96 protrudes from the front of the cartridge 90. As shown in FIG. 7, the locking tab 52 includes a projection 58 that is in contact with the lip 96 of the removable cartridge 90. For example, the projection 58 of the locking tab 52 is configured to contact the bottom of the lip 96 of the cartridge 90 when the manifold 2 is in its closed position. The contact between the projection 58 and the lip 96 of the cartridge 90 is configured to prevent the lever 40 from being moved from the closed position (e.g., lifted upwards).

As shown in FIG. 7, in the closed position, the projection 58 hooks the locking tab 52 and the lever 40 onto the lip 96 of the cartridge 90, which prevents actuation/lifting of the lever 40. The application of the external force $F_1$ to the locking tab 52 (e.g., by a technician, by an automated arm, or the like) moves/pushed the locking tab 52 in direction $D_3$, such that the projection 58 no longer contacts the lip 96 of the removable cartridge 90 (i.e., the projection 58 is no longer hooked on the lip 96 of the cartridge 90). As the moved/pushed projection 58 is not hooked on the lip 96 of the cartridge 90, the locking tab 52 no longer restricts movement of the lever and allows for the lever 40 to be moved (e.g., lifted upwards). When the lever 40 is actuated/moved back into its closed position as shown in FIG. 7 (e.g., lowered into its closed position), the actuation of the lever 40 into its closed position applies force to the locking tab 52 which moves the locking tab 52 in direction $D_3$ and allows the projection 58 to move past the lip 96 of the cartridge 90. When the lever 40 moves into its closed position, the spring 54 pushes the projection 58 back into position in contact with the bottom of the lip 96 of the cartridge 90 and that hooks the locking tab 52 on the lip 96 of the cartridge 90.

Figure 8:
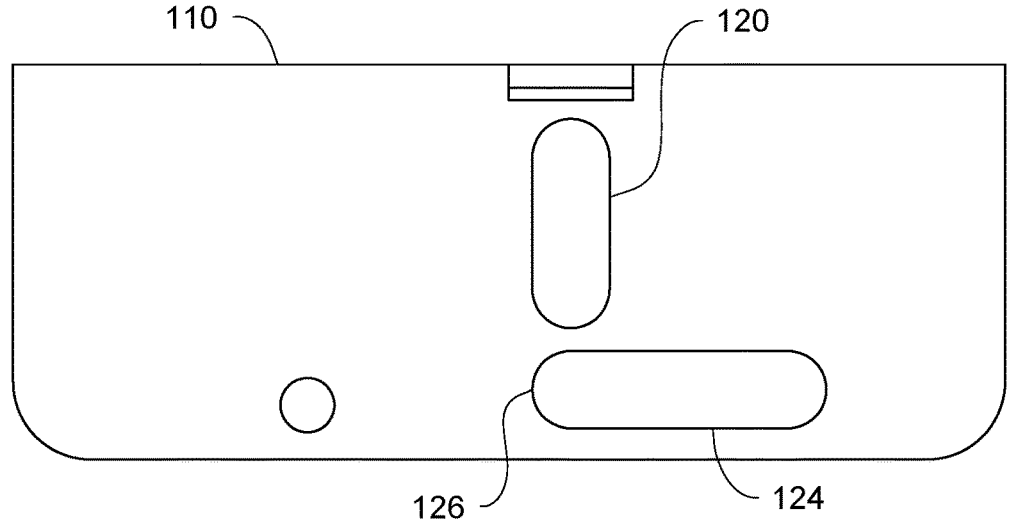
FIG. 8 is a side view of an embodiment of a first side plate for a connection assembly.

FIG. 8 is a side view of another embodiment of a first plate 110 for a manifold of a connection assembly. For example, the first plate 110 may be used in an embodiment of a manifold of a connection assembly similar to the first plate 10 in the manifold 2 of the connection assembly 1 in FIGS. 1A-7. The first plate 110 can have features similar to the first plate 10 in FIGS. 1A-7, except for position/shape of the second longitudinal slots 124 in the first plate 110 (the second longitudinal slot in the second sidewall of the first plate 110 is obscured in FIG. 8). As shown in FIG. 8, the second longitudinal slot 124 in the first plate 110 may be shaped such that the second end 126 of the second longitudinal slot 124 is not offset from the first longitudinal slot 120.

Figure 9:
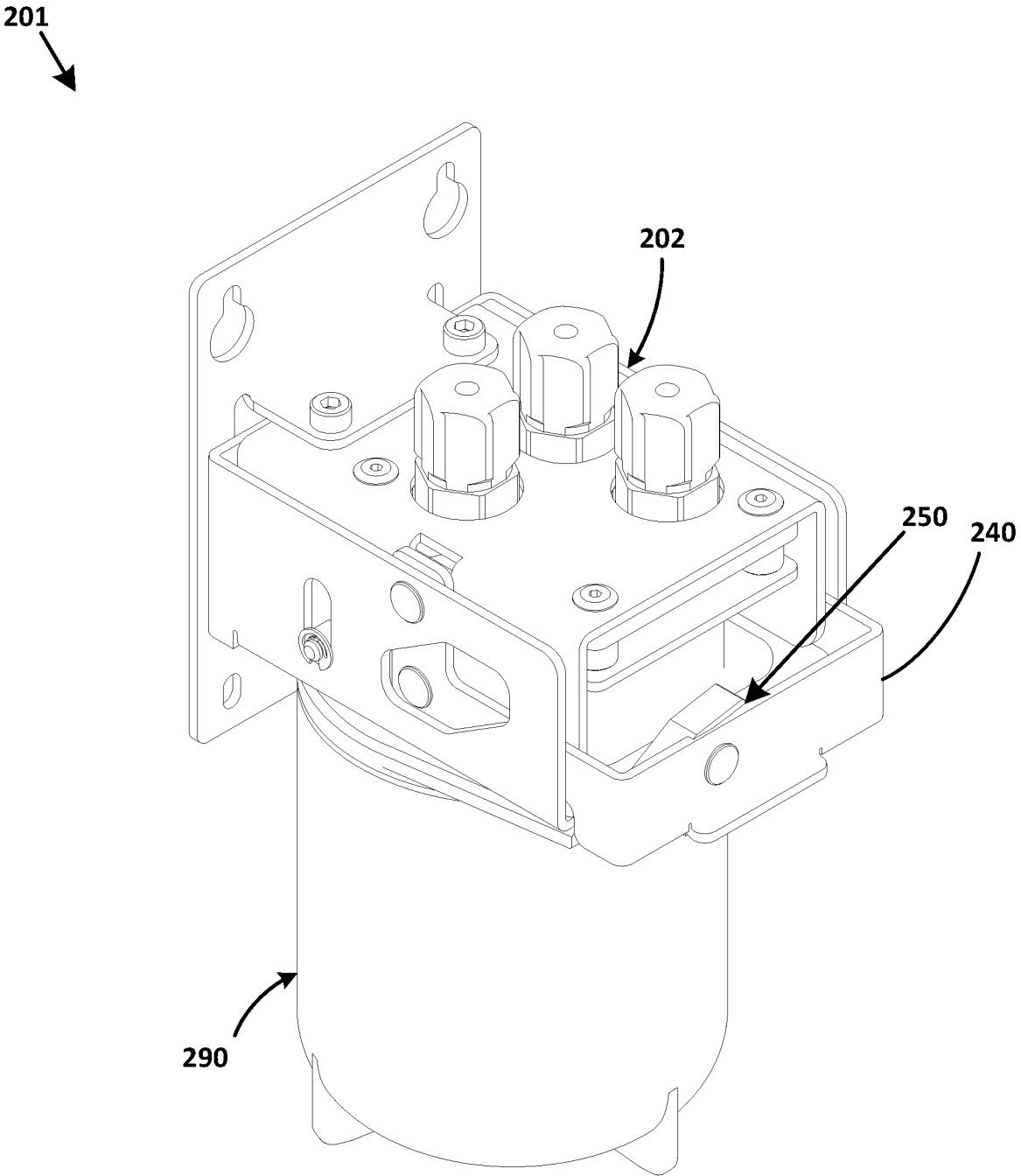
FIG. 9 is a perspective view of an embodiment of a connection assembly with a removable cartridge.

FIG. 9 shows a perspective view of an embodiment of a connection assembly 201. The connection assembly 201 includes a manifold 202. A removable cartridge 290 is disposed in the manifold 2. The connection assembly 201 has a similar configuration as the connection assembly 201 in FIG. 1A, except for the locking mechanism 250 for the lever 240. It should be appreciated that the connection assembly 201 and its manifold 202 (and the parts thereof) may be modified as discussed herein in other embodiments.

Figure 10:
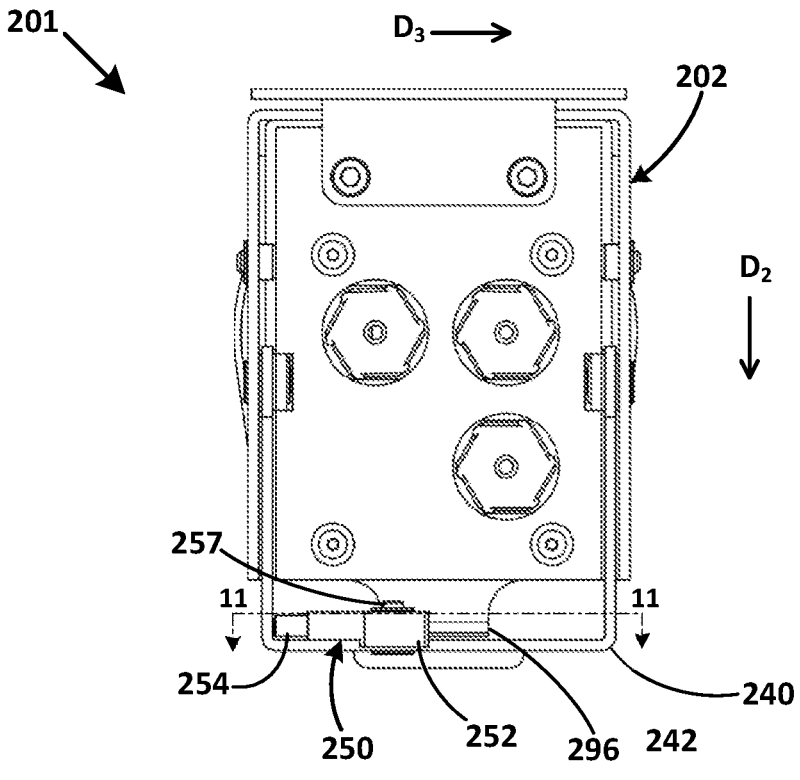
FIG. 10 is a top view of the connection assembly in FIG. 9, according to an embodiment.

FIG. 10 is a top view of the connection assembly 201 in FIG. 9, according to an embodiment. The connection assembly 201 includes a locking tab 252 and a spring 254. The locking tab 252 and the spring 254 form the locking mechanism 250 for the lever 240. The locking tab 252 is moveably coupled to the lever 240. For example, the locking tab 252 is configured to be rotatably coupled to the handle 242 of the lever 240 such that the locking tab 52 is rotatable relative to the handle 242. For example, a shaft 257 extends through both the handle 242 of the lever 140 and the locking tab 252, and the locking tab 252 is configured to rotate around the shaft 257 (e.g., the locking tab 252 having a rotational axis formed by the shaft 257). The ends of the shaft 257 can be formed to prevent removal of the shaft 257 from the locking tab 252 and/or the lever 240.

Figure 11:
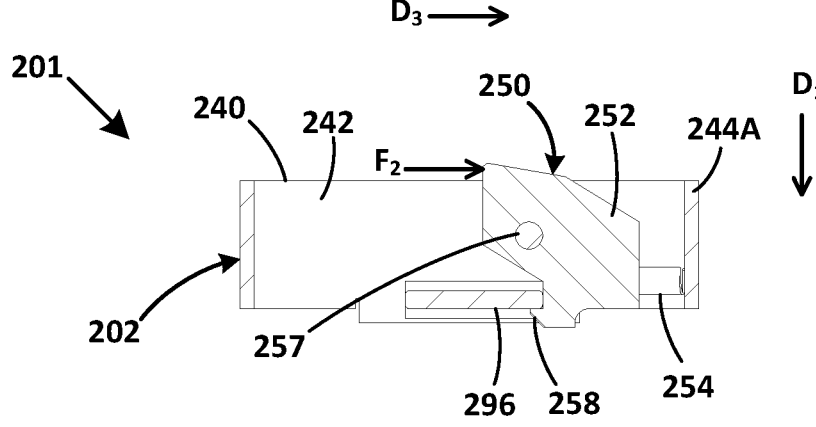
FIG. 11 is a is a cross-sectional view of the connection assembly as indicated in FIG. 10, according to an embodiment.

FIG. 11 is a vertical cross-sectional view of the connection assembly 201 as indicated in FIG. 10, according to an embodiment. The cartridge 290 can have similar features to the cartridge 90 as shown in FIGS. 1A-2B and discussed above. For example, as similarly discussed above for the cartridge 90, the cartridge 290 includes an outward protruding lip 296. The lip 296 protrudes from the front of the cartridge 290. As shown in FIG. 11, the locking tab 252 includes a projection 258 that is in contact with the lip 296 of the removable cartridge 290. For example, the projection 258 of the locking tab 252 is configured to contact the bottom of the lip 296 of the cartridge 290 when the manifold 202 is in its closed position. The contact between the projection 258 and the lip 296 of the cartridge 90 is configured to prevent the lever 240 from being moved from the closed position (e.g., lifted upwards).

The spring 254 biases the locking tab 252 (e.g., in the direction opposite to the direction $D_3$). The spring 254 pushes the locking tab 252 in a first direction (e.g., pushes the locking tab 252 away from the first side portion 244A of the lever, in the direction opposite to the direction $D_3$). As the locking tab 252 is rotatably coupled to the lever 240, the biasing/pushing of the spring 254 on the locking tab 252 biases the locking tab 252 in a first rotational direction (e.g., in the clockwise direction in FIG. 11). The locking tab 252 is configured to prevent the lever 240 from moving the manifold 202 from the closed position (as shown in FIGS. 9 and 10) without application of an external force $F_2$ to the locking tab 252. The spring 254 is configured to prevent the locking tab 252 from moving (e.g., from rotating) unless the external force $F_2$ opposite to its biasing direction (e.g., in direction $D_3$) is applied to the locking tab 252.

As shown in FIG. 11, in the closed position, the projection 258 hooks the locking tab 252 and the lever 240 onto the lip 296 of the cartridge 290, which prevents actuation/lifting of the lever 240. The biasing of the spring 254 pushes the locking tab 252 against the lip 296 of the cartridge 290. The application of the external force $F_2$ to the locking tab 252 (e.g., by a technician, by an automated arm, or the like) moves/rotates the locking tab 252 in a second direction (e.g., in a second rotational direction, counterclockwise in FIG. 11), such that the projection 258 no longer contacts the lip 296 of the cartridge 290 (i.e., the projection 258 is no longer hooked on the lip 296 of the cartridge 290). As the moved projection 258 is not hooked on the lip 296 of the cartridge, the locking tab 252 no longer restricts movement of the lever 240 and allows for the lever 240 to be moved (e.g., lifted upwards). When the lever 240 is actuated/moved back into its closed position as shown in FIG. 10 (e.g., lowered into its closed position), the actuation of the lever 240 into its closed position applies force to the locking tab 252 which rotates the locking tab 252 in the second rotational direction (e.g., counterclockwise in FIG. 11) and allows the projection 258 to move past the lip 296 of the cartridge 290. When the lever 240 moves into its closed position, the spring 254 then pushes/rotates the projection 258 back into position in contact with the bottom of the lip 296 of the cartridge 290 and that hooks the locking tab 252 on the lip 296 of the cartridge 290.

ASPECTS

Any of Aspects 1-10 may be combined with any of Aspects 11-20.

Aspect 1. A connection assembly comprising: a manifold including: a first plate including a first longitudinal slot and a second longitudinal slot that extend at or about perpendicular to each other; a second plate including sidewalls and flanges extending from the sidewalls, the flanges configured to support a removable cartridge, and the first plate being disposed between the sidewalls of the second plate; a lever pivotably coupled to the first plate and the second plate, the lever configured to move the second plate relative to the first plate between a first position and a second position, the lever including side portions; a first shaft extending through the first longitudinal slot in the first plate, one of the sidewalls of the second plate, and one of the side portions of the lever; and a second shaft extending through the second longitudinal slot in the first plate and one of the side portions of the lever.

Aspect 2. The connection assembly of Aspect 1, wherein in the first position, the first shaft is disposed at a first end of the first longitudinal slot and the second shaft is disposed at a first end of the second longitudinal slot, and wherein in the second position, the first shaft is disposed at a second end of the first longitudinal slot and the second shaft is disposed at a second end of the second longitudinal slot.

Aspect 3. The connection assembly of any one of Aspects 1 and 2, further comprising: a locking tab moveably coupled to the lever, and wherein in the second position, a projection of the locking tab is positioned to be disposed under and in contact with a lip of the removable cartridge disposed in the manifold.

Aspect 4. The connection assembly of Aspect 3, wherein the locking tab is configured to prevent the lever from moving from the second position without application of an external force to the locking tab.

Aspect 5. The connection assembly of any one of Aspects 3 and 4, further comprising: a spring biasing the locking tab in a first direction, the locking tab is configured to prevent the lever from moving from the second position without application of an external force to the locking tab in a direction opposite to the first direction.

Aspect 6. The connection assembly of any one of Aspects 1-5, wherein the second plate includes an end plate that extends between and connects the sidewalls of the second plate, each of the sidewalls and the end plate being disposed on a different side of the first plate.

Aspect 7. The connection assembly of any one of Aspects 1-6, further comprising: a mounting plate for mounting the connection assembly, the mounting plate fixedly attached to one of the first plate and the second plate.

Aspect 8. The connection assembly of any one of Aspects 1-7, wherein the first longitudinal slot is a vertical slot and the second longitudinal slot is a horizontal slot.

Aspect 9. The connection assembly of any one of Aspects 1-8, further comprising: ports fixedly connected to the first plate for passing fluid through the removable cartridge, the ports extending through a top wall of the first plate, and the plurality of ports are configured to fluidly connect to the removable cartridge in the second position for supplying fluid through the removable cartridge.

Aspect 10. The connection assembly of any one of Aspects 1-9, wherein the side portions of the lever are each disposed between the first plate and the second plate.

Aspect 11. A connection assembly comprising: a manifold including: a first plate including a first longitudinal slot extending in a first direction and a second longitudinal slot extending in a second direction that is at or about perpendicular to the first direction, the second longitudinal slot having a first end and a second end that are each offset from the first longitudinal slot in the first direction; a second plate including sidewalls and flanges extending from the sidewalls, the flanges configured to support a removable cartridge, and the first plate being disposed between the sidewalls of the second plate; a lever pivotably coupled to the first plate and the second plate, the lever configured to move the second plate relative to the first plate between a first position and a second position, the lever including side portions; a first shaft extending through the first longitudinal slot in the first plate, one of the sidewalls of the second plate, and one of the side portions of the lever; and a second shaft extending through the second longitudinal slot in the first plate and one of the side portions of the lever.

Aspect 12. The connection assembly of Aspect 11, wherein in the first position, the first shaft is disposed at a first end of the first longitudinal slot and the second shaft is disposed at the first end of the second longitudinal slot, and wherein in the second position, the first shaft is disposed at a second end of the first longitudinal slot and the second shaft is disposed at the second end of the second longitudinal slot.

Aspect 13. The connection assembly of Aspect 12, wherein in the first position, an angle between a longitudinal axis of the first longitudinal slot and a vector extending from an axis of the first shaft to an axis of the second shaft is greater than 0 degrees, and wherein in the second position, an angle between the longitudinal axis of the first longitudinal slot and a vector extending from the axis of the first shaft to the axis of the second shaft is less than 0 degrees.

Aspect 14. The connection assembly of any one of Aspects 11 and 12, wherein the first shaft is configured such that actuating from the first position to the second position moves the first shaft in the first direction within first longitudinal slot; and the second shaft is configured such that actuating from the first position to the second position moves the second shaft in the second direction within the second longitudinal slot.

Aspect 15. The connection assembly of any one of Aspects 11-14, further comprising: a locking tab movably coupled to the lever, and wherein in the second position, a projection of the locking tab is positioned to be disposed under and in contact with a lip of the removable cartridge disposed in the manifold.

Aspect 16. The connection assembly of Aspect 15, wherein the locking tab is configured to prevent the lever from moving from the second position without application of an external force to the locking tab.

Aspect 17. The connection assembly of any one of Aspects 15 and 16, further comprising: a spring biasing the locking tab in a first direction, the locking tab is configured to prevent the lever from moving from the second position without application of an external force to the locking tab in a direction opposite to the first direction.

Aspect 18. The connection assembly of any one of Aspects 11-17, further comprising: a mounting plate for mounting the connection assembly, the mounting plate fixedly attached to the first plate.

Aspect 19. The connection assembly of any one of Aspects 11-18, wherein the first longitudinal slot is a vertical slot and the second longitudinal slot is a horizontal slot.

Aspect 20. The connection assembly of any one of Aspects 11-19, wherein the second plate includes an end plate that extends between and connects the sidewalls of the second plate, each of the sidewalls and the end plate being disposed on a different side of the first plate.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A connection assembly comprising:
a manifold including:
a first plate including a first longitudinal slot and a second longitudinal slot that extend at or about perpendicular to each other;
a second plate including sidewalls and flanges extending from the sidewalls, the flanges configured to support a removable cartridge, and the first plate being disposed between the sidewalls of the second plate;
a lever pivotably coupled to the first plate and the second plate, the lever configured to move the second plate relative to the first plate between a first position and a second position, the lever including side portions;
a first shaft extending through the first longitudinal slot in the first plate, one of the sidewalls of the second plate, and one of the side portions of the lever; and
a second shaft extending through the second longitudinal slot in the first plate and one of the side portions of the lever.

2. The connection assembly of claim 1,
wherein in the first position, the first shaft is disposed at a first end of the first longitudinal slot and the second shaft is disposed at a first end of the second longitudinal slot, and
wherein in the second position, the first shaft is disposed at a second end of the first longitudinal slot and the second shaft is disposed at a second end of the second longitudinal slot.

3. The connection assembly of claim 1, further comprising:

a locking tab moveably coupled to the lever, and wherein in the second position, a projection of the locking tab is positioned to be disposed under and in contact with a lip of the removable cartridge disposed in the manifold.

4. The connection assembly of claim 3, wherein the locking tab is configured to prevent the lever from moving from the second position without application of an external force to the locking tab.

5. The connection assembly of claim 3, further comprising:

a spring biasing the locking tab in a first direction, the locking tab is configured to prevent the lever from moving from the second position without application of an external force to the locking tab in a direction opposite to the first direction.

6. The connection assembly of claim 1, wherein the second plate includes an end plate that extends between and connects the sidewalls of the second plate, each of the sidewalls and the end plate being disposed on a different side of the first plate.

7. The connection assembly of claim 1, further comprising:

a mounting plate for mounting the connection assembly, the mounting plate fixedly attached to one of the first plate and the second plate.

8. The connection assembly of claim 1, wherein the first longitudinal slot is a vertical slot and the second longitudinal slot is a horizontal slot.

9. The connection assembly of claim 1, further comprising:

ports fixedly connected to the first plate for passing fluid through the removable cartridge, the ports extending through a top wall of the first plate, and the plurality of ports are configured to fluidly connect to the removable cartridge in the second position for supplying fluid through the removable cartridge.

10. The connection assembly of claim 1, wherein the side portions of the lever are each disposed between the first plate and the second plate.

11. A connection assembly comprising:

a manifold including:

a first plate including a first longitudinal slot extending in a first direction and a second longitudinal slot extending in a second direction that is at or about perpendicular to the first direction, the second longitudinal slot having a first end and a second end that are each offset from the first longitudinal slot in the first direction;

a second plate including sidewalls and flanges extending from the sidewalls, the flanges configured to support a removable cartridge, and the first plate being disposed between the sidewalls of the second plate;

a lever pivotably coupled to the first plate and the second plate, the lever configured to move the second plate relative to the first plate between a first position and a second position, the lever including side portions;

a first shaft extending through the first longitudinal slot in the first plate, one of the sidewalls of the second plate, and one of the side portions of the lever; and a second shaft extending through the second longitudinal slot in the first plate and one of the side portions of the lever.

12. The connection assembly of claim 11, wherein in the first position, the first shaft is disposed at a first end of the first longitudinal slot and the second shaft is disposed at the first end of the second longitudinal slot, and wherein in the second position, the first shaft is disposed at a second end of the first longitudinal slot and the second shaft is disposed at the second end of the second longitudinal slot.

13. The connection assembly of claim 12, wherein in the first position, an angle between a longitudinal axis of the first longitudinal slot and a vector extending from an axis of the first shaft to an axis of the second shaft is greater than 0 degrees, and wherein in the second position, an angle between the longitudinal axis of the first longitudinal slot and a vector extending from the axis of the first shaft to the axis of the second shaft is less than 0 degrees.

14. The connection assembly of claim 12, wherein the first shaft is configured such that actuating from the first position to the second position moves the first shaft in the first direction within first longitudinal slot; and the second shaft is configured such that actuating from the first position to the second position moves the second shaft in the second direction within the second longitudinal slot.

15. The connection assembly of claim 11, further comprising:

a locking tab moveably coupled to the lever, and wherein in the second position, a projection of the locking tab is positioned to be disposed under and in contact with a lip of the removable cartridge disposed in the manifold.

16. The connection assembly of claim 15, wherein the locking tab is configured to prevent the lever from moving from the second position without application of an external force to the locking tab.

17. The connection assembly of claim 15, further comprising:

a spring biasing the locking tab in a first direction, the locking tab is configured to prevent the lever from moving from the second position without application of an external force to the locking tab in a direction opposite to the first direction.

18. The connection assembly of claim 11, further comprising:

a mounting plate for mounting the connection assembly, the mounting plate fixedly attached to the first plate.

19. The connection assembly of claim 11, wherein the first longitudinal slot is a vertical slot and the second longitudinal slot is a horizontal slot.

20. The connection assembly of claim 11, wherein the second plate includes an end plate that extends between and connects the sidewalls of the second plate, each of the sidewalls and the end plate being disposed on a different side of the first plate.

* * * * *